(12) United States Patent
Wu

(10) Patent No.: US 7,891,887 B1
(45) Date of Patent: Feb. 22, 2011

(54) CAMERA STAND

(75) Inventor: Ying-Kuei Wu, Taipei Hsien (TW)

(73) Assignee: Yikuen Sheng Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 12/475,532

(22) Filed: May 31, 2009

(51) Int. Cl.
*G03B 17/00* (2006.01)
(52) U.S. Cl. ............... 396/428; 248/178.1; 348/373
(58) Field of Classification Search ........... 396/428; 248/178.1; 348/373
See application file for complete search history.

(56) References Cited

U.S. PATENT DOCUMENTS

| | | | | |
|---|---|---|---|---|
| 686,872 A * | 11/1901 | Whetham | ............... | 248/169 |
| 687,347 A * | 11/1901 | Stapleton | ............... | 248/181.1 |
| 3,881,675 A * | 5/1975 | Matchett | ............... | 248/170 |
| 7,281,693 B2 * | 10/2007 | Chou | ............... | 248/181.1 |
| 2007/0090237 A1 * | 4/2007 | Hsu | ............... | 248/178.1 |

* cited by examiner

*Primary Examiner*—Rodney E Fuller
*Assistant Examiner*—Fang-Chi Chang
(74) *Attorney, Agent, or Firm*—Pro-Techtor Int'l Services; Ralph Willgohs

(57) ABSTRACT

A camera stand of the present invention is composed of a deck for controlling a shooting angle of a camera. The deck is provided on one foot tube of a camera tripod and when a user rotates that foot tube, a slid-proof rod can drive a slid-proof sleeve, which is assembled with the slid-proof rod as one unit, to abut a ball below the deck for positioning. When the foot tube is loosened by rotating reversely, the slid-proof sleeve can escape from the ball, such that the deck can move freely to adjust the shooting angle of the camera.

3 Claims, 4 Drawing Sheets

CAMERA STAND

BACKGROUND OF THE INVENTION a) Field of the Invention

The present invention relates to a camera stand, and more particularly to a small camera stand, wherein a switch to control positioning and movement of a deck is provided on one foot tube of a tripod such that no grotesque snap will be installed additionally, and an original shape of the camera tripod can be preserved. As a slid-proof rod and a slid-proof sleeve on the foot tube are assembled as one unit, the foot tube will not drop out when the slid-proof sleeve is rotated loose to escape from a ball below the deck.

b) Description of the Prior Art

Referring to FIGS. 6 and 7, a conventional camera stand includes primarily a tripod 101, 201 which is connected below a stand seat 100, 200, wherein above the stand seat 100, 200 is pivoted with a deck 102, 202, above the deck 102, 202 is provided with a stud 1021, 2021, and the stud 1021, 2021 can be locked at a bottom of a camera. By lifting the deck 102, 202, an angle of the deck 102, 202 can be changed to facilitate altering a shooting angle of the camera. On the other hand, in order to fix the deck 102, 202, all camera stands on an existing market should be added with a snap 300 additionally, such that when a fastener at a lower end of the deck 102, 202 is tightly engaged by the snap 300, the deck 102, 202 will be fixed without being able to move; whereas, when the snap 300 releases, a position of the deck 102, 202 can be adjusted freely.

As all the conventional tripods are provided with the protruded snap 300, cost of parts and production can be increased and entire appearance of the camera tripod can be ruined. In addition, the protruded snap 300 will be easily hooked to clothes, resulting in drop out of the tripod to damage the camera, thus requiring for improvement.

SUMMARY OF THE INVENTION

Accordingly, the primary object of the present invention is to provide a camera stand, wherein by only rotating one foot tube, a deck for adjusting a shooting angle of a camera can be locked tightly or released. As the present invention is not additionally provided with a grotesque snap, entire appearance is not altered, which will save materials and cost, and can even prevent the stand from being hooked by foreign objects that a camera drops out.

Another object of the present invention is to provide a camera stand, wherein a tripod itself is not added with a grotesque snap, hence, size of the stand can be decreased, such that the tripod becomes a mini structure. In addition, a stud of a deck can be locked with a ring to form a key chain which can be carried personally.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
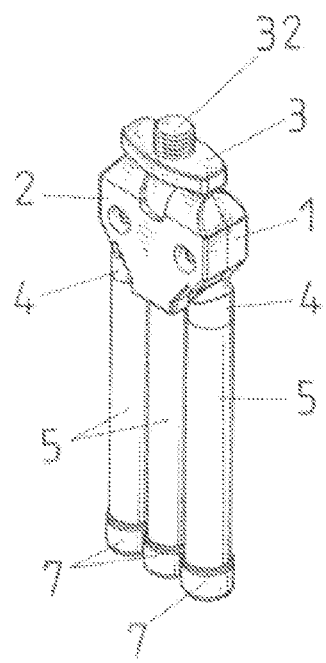
FIG. 1 shows a perspective view of the present invention.
Figure 2:
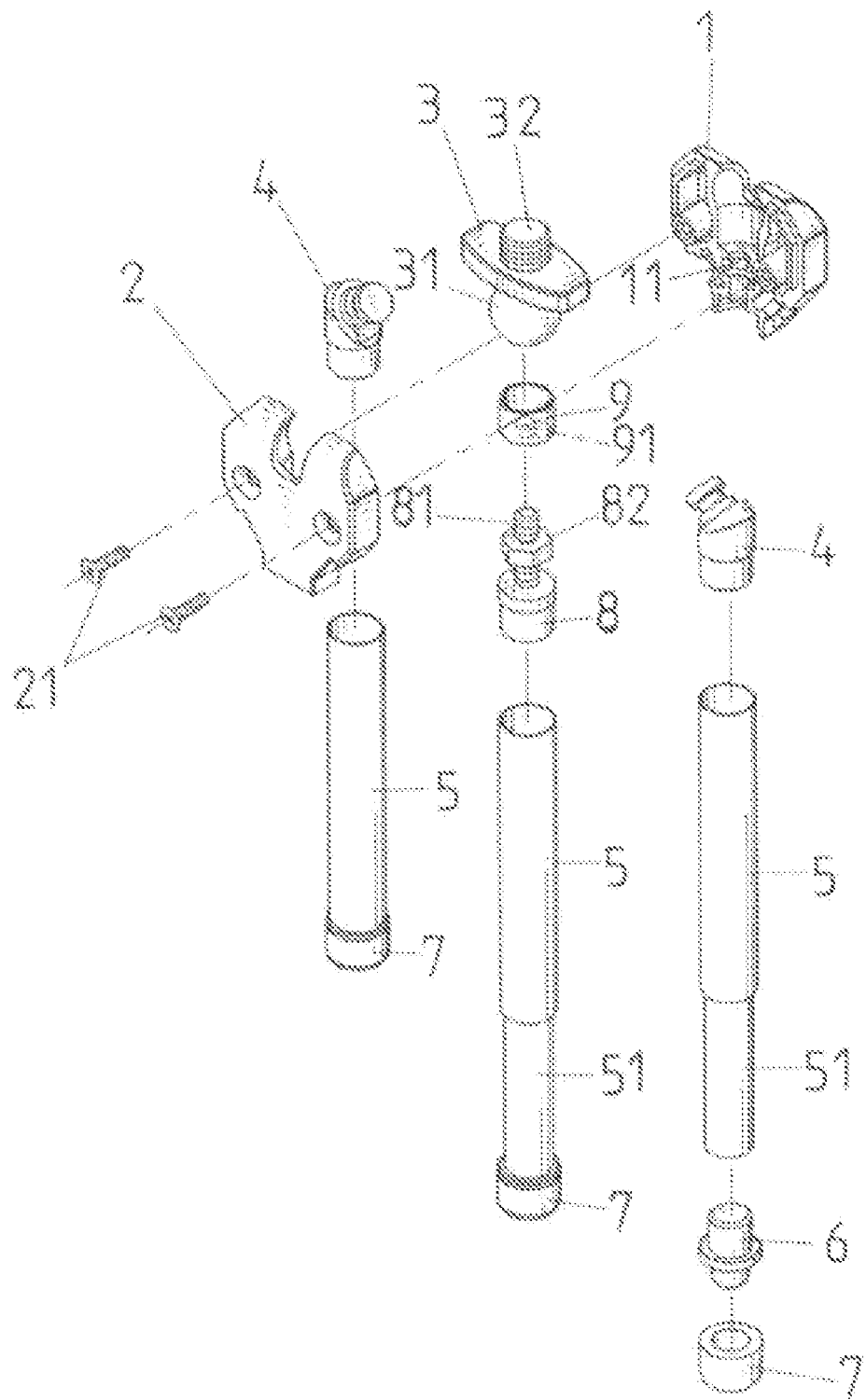
FIG. 2 shows an exploded perspective view of the present invention.

Referring to FIGS. 1 and 2, the present invention comprises a front housing 1, a rear housing 2, a deck 3, two spindles 4, three foot tubes 5, three tube sleeves 6 and three foot pads 7, wherein the front and rear housings 1, 2 are symmetrical to each other and can be locked together by two screws 21; below the deck 3 is provided with the front housing 1 and the rear housing 2, and a bottom of the deck 3 is provided with a ball 31 which can be put into the front and rear housings 1, 2; a top of a stud 32 can be locked into a screw-hole at a bottom of a camera; top ends of the two spindles 4 can be emplaced respectively into the front and rear housings 1,2, and bottom ends can be inserted respectively into two foot tubes 5 such that the foot tubes 5 can rotate with the spindles 4 as pivots; interiors of the foot tubes 5 are provided respectively with an expandable tube 51 which is extracted into the foot tube 5 normally and can be pulled out when the camera stand is to be lifted up; and bottom ends of the three foot tubes 5 can be inserted respectively into the tube sleeve 6, a bottom end of which can be inserted into the foot pad 7.

Figure 4:
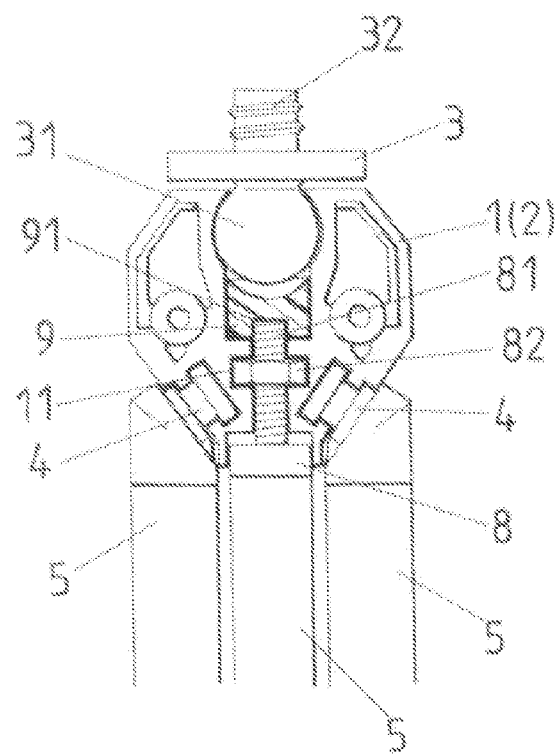
FIG. 4 shows a cutaway view of the present invention, wherein a deck has been loosened.
Figure 5:
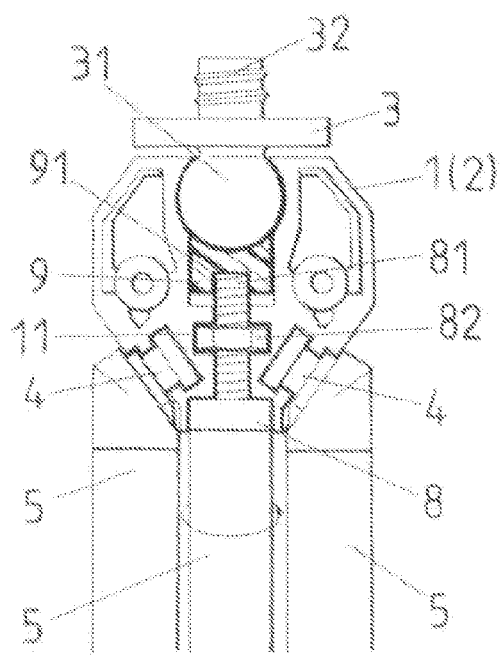
FIG. 5 shows another cutaway view of the present invention, wherein a deck has been locked.
Figure 6:
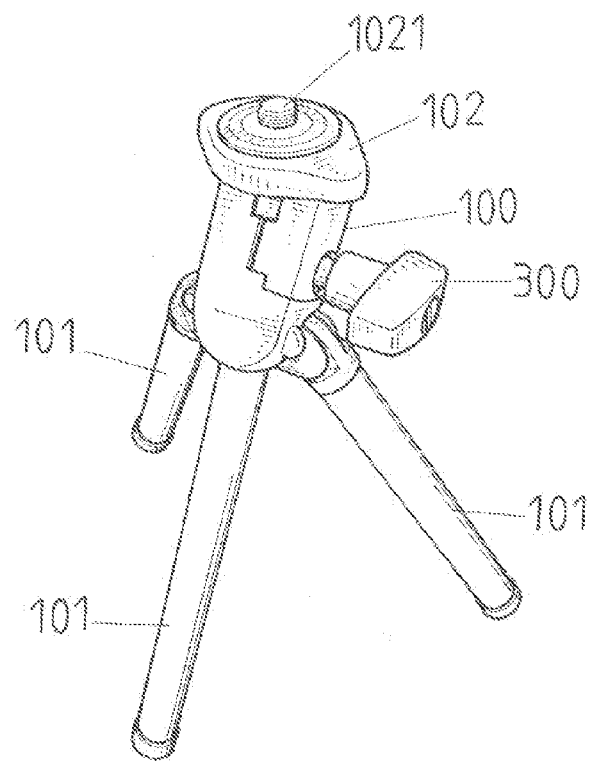
FIG. 6 shows a perspective view of a conventional product.
Figure 7:
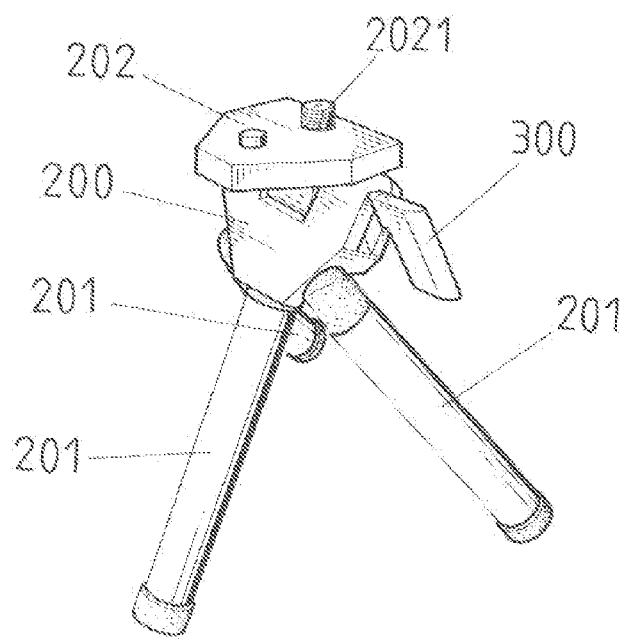
FIG. 7 shows a perspective view of an embodiment of a conventional product.

A top end of the foot tube 5 can be inserted into a slid-proof rod 8 and a stud 81 at a top end of the slid-proof rod 8 is provided with a nut 82. Referring to FIG. 4, the nut 82 is locked in a slot 11 between the symmetrical front and rear housings 1, 2, and the stud 81 above the slid-proof 8 is connected into a positioning hole 91 of a slid-proof sleeve 9, allowing the slid-proof rod 8 to be assembled with the slid-proof sleeve 9 as one unit. A top of the slid-proof sleeve 9 is in an arc-shape and is emplaced at a lower end of a ball 31 of the deck 3. Normally, the slid-proof sleeve 9 is not tightly assembled with the ball 31, and hence, the deck 3 is loose. Referring to FIG. 5, when a user rotates that foot tube 5, he or she can drive the slid-proof rod 8 to rotate upward. At this time, the stud 81 can drive the slid-proof sleeve 9 to abut upward the ball 31 tightly, allowing the deck 3 not to move and therefore to be positioned. If a shooting angle of a camera is to be adjusted, then only the foot tube 5 needs to be rotated loose in a reverse direction that the slid-proof rod 8 can be driven to gyrate downward. At this time, the stud 81 drives the slid-proof sleeve 9 downward and the ball 31 is not abutted tightly by the slid-proof sleeve 9; hence, the deck 3 can move freely to adjust the shooting angle.

Figure 3:
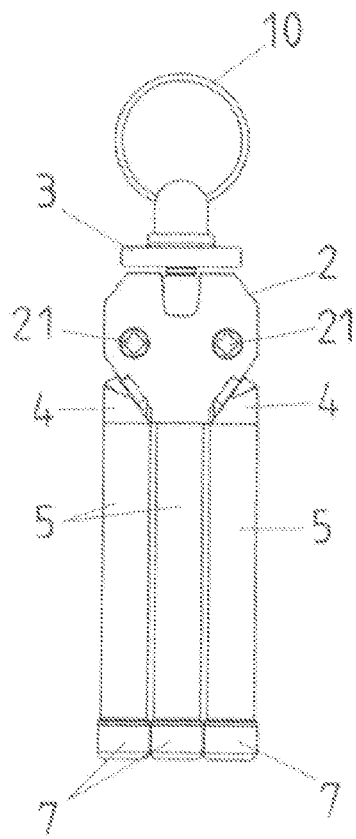
FIG. 3 shows a front view of an implementation of the present invention.

Above the deck 3 is provided with the stud 32 which can be locked at a bottom of a camera. Referring to FIG. 3, the stud 32 can be locked with a ring 10 to form a key chain which can be carried personally.

As will be apparent from the foregoing, the present invention is a small camera stand, of which a structure for locking and loosening a deck (or for adjusting a shooting angle of a camera) is one foot tube of a tripod. Therefore, no additional grotesque snap needs to be provided, which will not affect appearance and shape of the camera stand, can even save materials and production cost, and can form a key chain that can be carried personally.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A camera stand comprising a front housing, a rear housing, two spindles, three foot tubes, three tube sleeves and three foot pads and a deck, wherein the front and rear housings are symmetrical to each other and are locked together by screws; below the deck is provided with the front and rear housings and a bottom end of the deck is a ball which is emplaced into the front and rear housings; top ends of the two spindles are emplaced respectively into the front and rear housings, and bottom ends are inserted respectively into the foot tubes which rotate with the spindles as pivots; bottom ends of the three foot tubes are inserted respectively into the tube sleeve, a bottom end of which is inserted into the respective foot pad; a top end of one foot tube being inserted into a slid-proof rod, a stud at a top end of the slid-proof rod being provided with a nut which is locked in a slot between the symmetrical front and rear housings; the stud of the slid-proof rod being connected into a slid-proof sleeve, allowing the slid-proof rod and the slid-proof sleeve to be assembled as one unit; when rotating that foot tube, the slid-proof rod being driven to gyrate upward, the stud on the slid-proof rod driving the slid-proof sleeve to abut upward the ball below the deck tightly, so as to position the deck; when the foot tube being loosened by rotating reversely, to drive the slid-proof rod to gyrate downward, the slid-proof sleeve not abutting the ball, such that the deck escapes to facilitate adjusting a shooting angle of a camera.

2. The camera stand according to claim 1, wherein an interior of the slid-proof sleeve is provided with a positioning hole, and the stud of the slid-proof rod is connected into the positioning hole of the slid-proof sleeve, allowing the slid-proof sleeve and the slid-proof rod to be assembled as one unit.

3. The camera stand according to claim 1, wherein a stud on the deck is locked with a ring to form a key chain.

* * * * *